United States Patent [19]
Pérez-Méndez et al.

[11] Patent Number: 5,754,978
[45] Date of Patent: May 19, 1998

[54] SPEECH RECOGNITION SYSTEM

[75] Inventors: Iván Pérez-Méndez, Boulder; David J. Trawick, Longmont, both of Colo.; Mark T. Anikst, Santa Monica, Calif.

[73] Assignee: Speech Systems of Colorado, Inc., Boulder, Colo.

[21] Appl. No.: 549,278

[22] Filed: Oct. 27, 1995

[51] Int. Cl.⁶ .................. G10L 5/06; G10L 9/00
[52] U.S. Cl. .................. 704/255; 704/239; 704/251
[58] Field of Search .................. 395/2.47, 2.48, 395/2.6, 2.64, 2.55, 2.49

[56] References Cited

U.S. PATENT DOCUMENTS

| | | |
|---|---|---|
| 3,198,884 | 8/1965 | Dersch . |
| 3,553,372 | 1/1971 | Wright et al. . |
| 4,069,393 | 1/1978 | Martin et al. ............ 395/2.6 |
| 4,087,632 | 5/1978 | Hafer ..................... 395/2.6 |
| 4,432,096 | 2/1984 | Bunge .................... 395/2.6 |
| 4,624,010 | 11/1986 | Takebayashi ............ 395/2.6 |
| 4,736,429 | 4/1988 | Niyada et al. ........... 395/2.6 |
| 4,903,304 | 2/1990 | Schlang et al. .......... 395/2.6 |
| 4,905,287 | 2/1990 | Segawa .................. 395/2.6 |
| 5,031,113 | 7/1991 | Hollerbauer ............ 395/2.44 |
| 5,056,150 | 10/1991 | Yu et al. ................. 395/2.6 |
| 5,101,434 | 3/1992 | King ...................... 395/2.6 |
| 5,151,940 | 9/1992 | Okazaki et al. .......... 396/2.6 |
| 5,182,765 | 1/1993 | Ishii et al. ............... 379/88 |
| 5,329,609 | 7/1994 | Sanada et al. ........... 395/2.6 |
| 5,347,612 | 9/1994 | Fujimoto ................. 395/2.52 |
| 5,390,279 | 2/1995 | Strong ................... 395/2.52 |
| 5,432,886 | 7/1995 | Tsukada et al. ......... 395/2.48 |

*Primary Examiner*—David R. Hudspeth
*Assistant Examiner*—Patrick N. Edouard
*Attorney, Agent, or Firm*—James R. Young, Chrisman, Bynum & Johnson, P.C.

[57] ABSTRACT

An improved speech recognition system with at least two speech recognition engines which may or may not be identical. Each of the speech recognition engines supply a recognized-text output signal each of which are provided to a text comparator. The comparator compares the recognized-text output signals and accepts or rejects the text based on the degree of agreement between the output signals from each of the engines. Completely different types of speech recognition engines can be employed. Alternatively, identical speech recognition engines could be employed with a slight perturbation added to one of the engines or the input signal of one of the engines. Alternatively, the very same speech recognition engine could be used at two different points in time, with one receiving some type of perturbation.

22 Claims, 6 Drawing Sheets

SPEECH RECOGNITION SYSTEM

The present invention relates to speech recognition systems, and in particular, to systems with increased recognition rates achieved by utilizing the results of multiple speech recognition systems.

BACKGROUND OF THE INVENTION

The following describes a typical speech recognition (SR) system. This description should be familiar to anyone in the field, and should give a general overview of the current approach to anyone else. When a person speaks, air compression waves are produced. These waves travel through the air to where others can hear them, or into a microphone of an SR system. A microphone converts this original speech signal into an analog electrical signal. Many different types of microphones exist with different characteristics. Some SR environments may require a particular type of microphone, for example, a noise canceling microphone.

Once the speech signal is converted into an analog electrical signal, some processing may take place to keep the values of the signal in a reasonable range. This is called gain control. Depending on what happens in the following digital signal processing stage, this step may or may not be necessary.

The analog speech signal is then converted into a digital speech signal with an analog-to-digital (A/D) converter. The A/D converter samples the analog signal at some constant rate in the tens of thousands of times per second, for example sixteen kiloHertz, and then outputs digital values of the speech signal for each sample time at the sample rate.

The next step is typically the digital signal processing (DSP) step. The digital signal from the A/D converter includes a tremendous amount of data per second; thus, its data rate is very high. The digital speech signal, comprising the samples output by the A/D converter, is transformed by a digital signal processor into another digital speech signal. The output signal from the DSP step will be at a much lower data rate, but will hopefully still contain the necessary information to determine what was spoken.

The DSP step uses various transform functions to determine several physical measurements of the speech signal for each frame of time. A frame is a portion of speech which is typically 10 milliseconds long. The measurements associated with a frame may include the amplitudes of the speech in several frequency bands (a filter-bank representation) or some other transform of the data such as the mel-filter cepstral coefficients, etc. The physical measurements associated with a frame computed by a specific SR system are called the frame features. The number of features per frame is typically between ten and twenty.

The collection of feature values for a frame can be considered a vector. Thus, the speech signal now includes (for example) a ten-dimensional feature vector for each ten millisecond frame. The data rate may now be further reduced by a process called vector quantization (VQ). This process finds the closest match of a feature vector to one of a set of prototype feature vectors. There are a fixed number of these prototype feature vectors, for example 250 vectors. If vector quantization is used, then the speech signal is converted from the original sequence of feature vectors into a sequence of prototype feature vectors. Since the SR system includes a list of prototype feature vectors, the speech signal can be represented by a sequence of indices into this list. This forms a very compact representation of the speech signal that is still suitable for the remaining processing.

The next step matches the speech signal with a speech model developed prior to recognition. The speech model is typically a set of hidden Markov models (HMMs), one for each recognition unit. An HMM is a statistical model that can be used to determine the probability that a given sequence of feature vectors will have been produced given that a sequence of recognition units was spoken.

The recognition unit will usually be either a word or a phoneme. A language model describes how the recognition units are put together to form sentences. The language model may include dictionary and grammar portions. The dictionary tells how to combine phonemes into words; the grammar tells how to combine words into sentences.

A process called Viterbi beam-search decoding is used to determine the most probable sentence. This process determines the probability of many sentences in parallel, extending the partial matches one frame at a time, together for all matches. Only the several most probable partial sentences are kept and extended on to the next frame. At the end of the input, the most probable sentence is selected as the output text. The probability determined during the decoding can be used as a score for the match between the input speech and the chosen sentence text.

Since the language model determines everything that can be said, it is usually possible to say something that is not in the language model, for example a word that is not in the vocabulary. Thus many systems implement some form of rejection processing. An input is rejected under certain conditions, and returns no output text. This is because in many speech recognition applications it is better to output nothing than to output something that is probably wrong.

The typical rejection system uses the score of the match between the input and the chosen output text. This score is compared to a threshold; if it is below the threshold, the utterance is rejected. Alternative rejection techniques may use the scores for subparts of the sentence, for example, the individual word or phoneme scores.

Some examples of some currently available speech recognition software are: "DragonDictate for Windows, Classic Edition" by Dragon Systems, Inc.; "Office Talk" and "Law Talk" by Kolvox Communications, Inc.; "Voice for Windows" by Kurzweil Applied Intelligence; "Phonetic Engine with VoiceMatch Toolkit and SpeechWizard" by Speech Systems, Inc.; and "Listen for Windows" and "Voice Commander" by Verbex Voice Systems, Inc.

Previously, others have employed certain aspects of parallel processing into speech recognition techniques, as opposed to rejection methods. Particularly, some have focused on improving speech recognition in adverse environments. For example, U.S. Pat. No. 5,182,765 (Ishii) discloses a speech registration/recognition system in which, as part of the registration process, the speech input signal is stored as recognition data. Subsequently, after registration and as part of the recognition process, the speech input signal is compared to the stored recognition data. In the embodiment shown in FIG. 8 of the '765 patent, and described at column 7, line 19 through column 8, line 42 thereof, a plurality of parallel speech recognition circuits each receive and store slightly altered versions of the input speech as part of the registration process. The intent is to improve the ability to recognize speech in adverse speech environments, such as high noise, etc. This is done by recording or registering speech or "training data" from many different environments (different types of background noise, for example). These slightly altered versions are created by different electrical characteristics in each of the variable characteristic circuits associated with each of the speech recognition circuits. However, details about the outputs of each of the speech recognition circuits are unspecified. Instead, the outputs are said to be fed via a data bus to a CPU for speech recognition processing based on the results of the comparison including coincidence data. Presumably, such a technique requires nearly identical types of speech recognition circuits so that the possible outputs of each can be meaningfully compared. In addition, the alterations caused by the variable characteristic circuit may be so dramatic as to cause adverse results in the recognition process.

U.S. Pat. No. 5,432,886 (Tsukada) discloses a speech recognition device with a pair of parallel similarity calculators for calculating the similarity between the input speech signal and certain predetermined, stored patterns or units. The two calculators or systems are used with the assumption that both systems will be similarly affected by the speech environment. Thus, for example, if the dual system is used in a noisy environment, both systems' recognition will be similarly affected so that the difference in their resulting scores (or perhaps the ratio of their resulting scores) will provide a score that has been corrected with respect to the effects of the environment. Apparently, reference patterns are used in the first of the pair of similarity calculators while recognition units are used in the second of the pair of similarity calculators. Each calculator appears to provide multiple outputs including a score for each of the possible components of recognized speech. The respective outputs of the pair of similarity calculators are routed to a similarity measure calculating unit where either the difference between the outputs or the ratio of the outputs is calculated. From this difference or ratio a determination is made of the speech recognized and/or rejected. Unfortunately, this technique appears to require two similarity calculators with identical types of outputs. Further, each similarity measure calculating unit appears to require a substantial amount of processing.

Both of these systems differ from the present invention in that they attempt to improve recognition directly, rather than improving recognition indirectly through a rejection method (the recognition rate on accepted utterances improves as incorrect utterances are rejected). Ishii does not mention a rejection method. Tsukada does mention a rejection method in its description, but this is just the standard rejection method on the corrected score (the score must exceed a threshold).

In both of these systems the scores of the parallel systems are very important and must be comparable (within the same range of values, interpretable in the same way, etc.) In Ishii, the maximum score over all the multiple recognizers is used to choose the output. In Tsukada, the scores of the parallel systems are used to provide a corrected score, which is claimed to be normalized with respect to the speech environment.

No mention is made in either system of whether or not the output text of the multiple systems must agree. In Ishii this does not matter, as the output choice will be the maximum scoring text. In Tsukada, the output appears to always be what was chosen by the primary similarity calculator (the main recognizer).

It is against this background and the desire to solve the problems of the prior art and to provide for increased recognition rates in speech recognition systems that the present invention has been developed.

SUMMARY OF THE INVENTION

Accordingly, it is an object of the present invention to provide a speech recognition system with an increased recognition rate over prior art systems.

It is also an object of the present invention to increase the recognition rate of speech recognition systems without a significant increase in the rejection rate.

It is further an object of the present invention to provide a technique with an increased recognition rate which can be employed in conjunction with existing recognition and rejection methods.

It is still further an object of the present invention to provide an improved speech recognition system which utilizes speech recognition engines which may be of different types and have diverse scoring methods.

It is still further an object of the present invention to provide an improved speech recognition system with multiple speech recognition engines which does not directly rely on the quantitative scores of the individual speech recognition engines.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to an improved speech recognition system for analyzing an input signal to recognize speech contained within the signal and output an accepted and recognized text signal. The system includes a first speech recognition engine receptive of the input signal and supplying a recognized-text output signal which represents in textual form the speech recognized in the input signal. The system also includes a second speech recognition engine receptive of the input signal and supplying a recognized-text output signal which represents in textual form the speech recognized in the input signal. The recognized-text output signals from the first and second speech recognition engines are supplied to a comparator which supplies the accepted and recognized-text output signal based upon the comparison of the recognized-text output signals. The accepted and recognized-text output signal represents in textual form the speech recognized in the input signal and accepted by the comparator.

Further, the comparison of the recognized-text output signals includes accepting portions of the text when the signals corresponding to those portions of the text are identical and rejecting those portions of the text when the signals corresponding to those portions of the text are different. The first and second speech recognition engines may be identical except for a perturbation added to one of the speech recognition engines. An engine perturbation may be added which alters the processing of one of the speech recognition engines. A signal perturbation may be added which alters the input signal received and processed by one of the speech recognition engines. Alternatively, the first and second speech recognition engines may be of different type so that a perturbation is not necessary. Also, the first and second speech recognition engines could be the very same speech recognition engine performing the processing as the first and second engines at different points in time. The first and second speech recognition engines could share a common first part of a speech recognition engine and have separate and distinct second parts of a speech recognition engine. The first part could include analog circuitry and the second part include analog and digital circuitry.

Alternatively, the first part could include analog circuitry and the second part include digital circuitry.

The improved speech recognition system could include any multiple number of speech recognition engines with a comparator receptive of the recognized-text output signals from each of the speech recognition engines. The comparator supplies the accepted and recognized text output signal based upon the comparison of the recognized-text output signals. Acceptance could occur when the recognized text output signals all agree. Alternatively, in the case of three speech recognition engines, the comparison of the recognized-text output signals includes accepting portions of the text when the signals from at least two of the speech recognition engines corresponding to those portions are identical and rejecting those portions of the text otherwise.

The present invention is also directed to a method of recognizing speech represented in an input signal. The method includes the steps of receiving the input signal, creating a first intermediate signal representative of the input signal, recognizing the speech contained in the first intermediate signal, and supplying a first recognized-text output signal representative of the speech recognized in the first intermediate signal. The method also includes creating a second intermediate signal representative of the input signal, recognizing the speech contained in the second intermediate signal, and supplying a second recognized-text output signal representative of the speech recognized in the second intermediate signal. The first and second recognized-text output signals are compared and portions of the compared signals that are identical are accepted.

Further, the method includes rejecting portions of the compared signals where they are not identical. The first and second intermediate signals may be identical and the recognizing steps may be different. The first and second intermediate signals may be different and the recognizing steps may be identical. The first and second intermediate signals may be different and the recognizing steps may also be different. The recognizing steps can be made different by adding a perturbation to one of the recognizing steps. The first and second intermediate signals may be different by adding a perturbation to one of the intermediate signals. The creating steps may be accomplished with analog circuitry.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings.

DETAILED DESCRIPTION OF THE PREFERRED EMBODIMENTS

Figure 1:
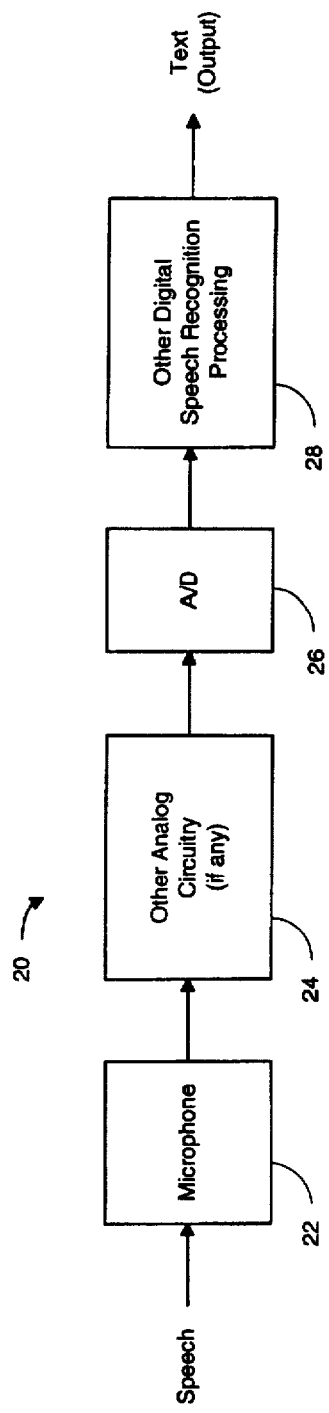
FIG. 1 is a block diagram of a speech recognition system known in the prior art.

A very generalized speech recognition system is shown in FIG. 1. This generalized speech recognition system 20 is well known to those with knowledge and experience in the speech recognition field. Generally, the system 20 includes a microphone 22 which is receptive of an audible speech signal made up of sound waves. The microphone 22 converts the sound waves of the speech signal to an electrical signal which is supplied to other analog circuitry 24. This circuitry 24 may include a preamplifier and/or analog bandpass filtering. The electrical output from the analog circuitry 24 is supplied to an analog-to-digital (A/D) converter 26. Alternatively, there may be no other analog circuitry 24 and the electrical signal from the microphone 22 may be applied directly to the analog to digital converter 26. Once the analog signal is converted to a digital signal it is supplied to the digital speech recognition processing 28 which may be implemented in digital hardware or in software residing in a digital computer. The digital speech recognition processing 28 supplies the recognized text as an output signal.

Figure 2:
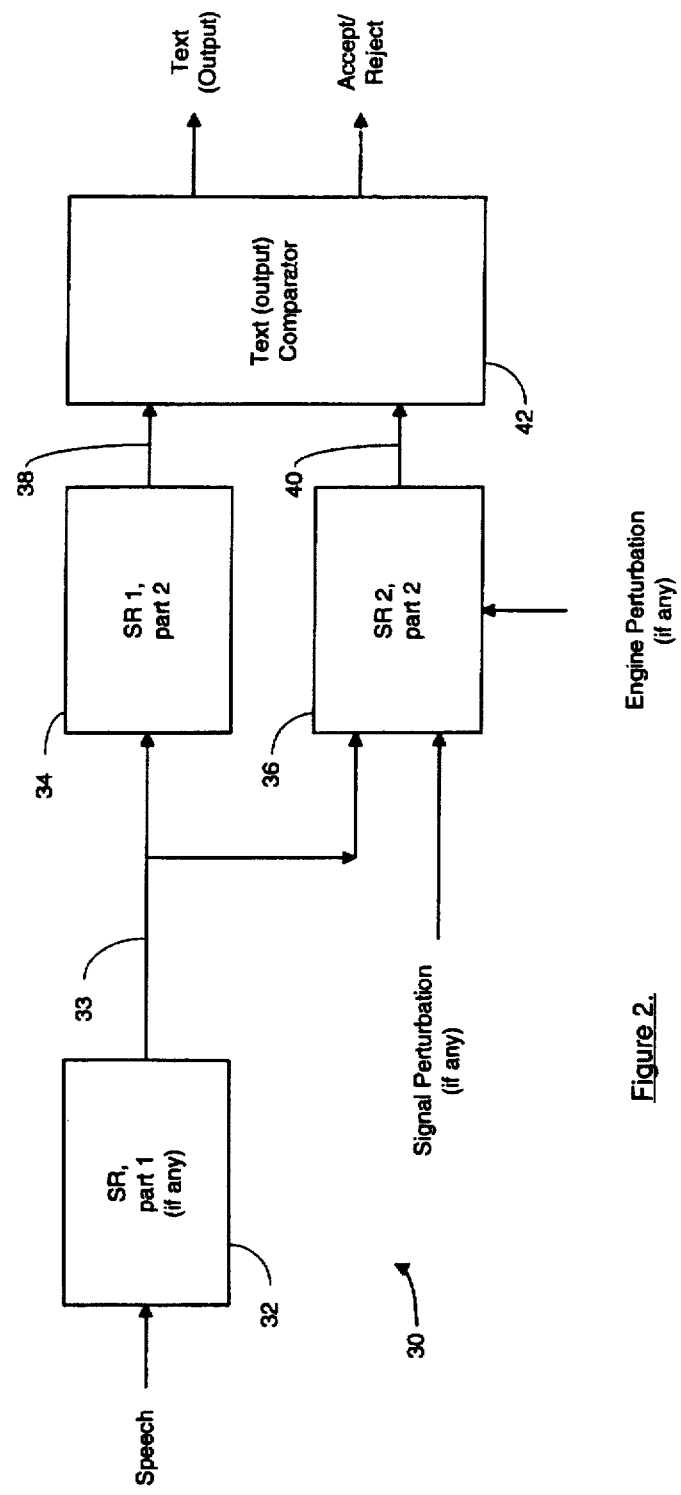
FIG. 2 is a block diagram of an improved speech recognition system according to the present invention.

The present invention includes an improved speech recognition system 30, as shown in FIG. 2. Just as the speech recognition system of FIG. 1 was shown to be divisible into separate parts, in that case analog and digital, the system 30 of FIG. 2 is also divisible into two separate parts, parts one and two. In this case, part one of a speech recognition (SR) engine 32 receives speech sound waves and converts them into an electrical signal 33. The signal 33 is supplied to the second parts of each of two different speech recognition engines 34 and 36. The first speech recognition engine 34 and the second speech recognition engine 36 may be any of the type of speech recognition engines previously discussed or any other speech recognition engine. The speech recognition engines 34 and 36 may be two completely different types of speech recognition engines/systems and may be produced by two different manufacturers. Alternatively, speech recognition engines 34 and 36 may be two different copies of an identical speech recognition engine. In addition, speech recognition engines 34 and 36 may be the very same speech recognition engine operated at two different points in time. It is desirable that the recognized-text output of each of the speech recognition engines 34 and 36 have the possibility to be slightly different. Therefore, if the identical speech recognition engine is used for the two engines 34 and 36 or a second copy of the identical engine (in digital form) is used for the engines 34 and 36, then it is necessary to insert a slight perturbation to one of the speech recognition engines. As shown in FIG. 2, a signal perturbation can be added to the second speech recognition engine to slightly change the signal 33 supplied to the speech recognition engine 36. Accordingly, with the signal slightly perturbed, the recognized-text output signal 40 from the speech recognition engine 36 will have the possibility to be slightly different than that from the speech recognition engine 34. Alternatively, or additionally, a slight engine perturbation can be supplied to the speech recognition engine 36 so as to slightly vary the processing of the speech recognition engine 36 and have the possibility to supply a slightly different output than that from the speech recognition engine 34.

To better understand what is meant by a signal perturbation, it may be helpful to consider speech recognition (SR) systems in a more abstract fashion. As a speech signal travels through an SR system, it is progressively transformed into some final representation which is usually text. Each piece of the SR system can be thought of as doing a conversion between speech representations. For example, the A/D converter changes the analog signal into a digital signal. The decoder translates the vector quantized sequence of feature vectors into text. All of the intermediate speech representations are subject to their own appropriate perturbation.

A perturbation may be applied directly to any of the given speech representations. When the values in the speech representation refer to physical values, such as in the original digitized signal, a perturbation may be applied directly by adding small values to the signal values. In the original digitized signal this may take the form of adding a "one" to every sample value, or choosing a "one" or "zero" randomly to add to every sample value. This may be considered to represent to represent a small amount of noise. Higher levels of speech representation, those closer to the final output, are more difficult to perturb directly. The sequence of vector quantized values could be perturbed by selecting alternate prototype vectors, say the second nearest, for every frame or for every other frame, etc.

Another way to introduce a perturbation is indirectly, by perturbing a portion of the SR engine. When a portion of an SR engine is perturbed, it will perturb the output signal of the perturbed engine portion. One means for creating different engines, or perturbing an engine relative to another, may be to implement the two different engines in analog circuitry. Because of the very nature of analog components and processing, the operation of that portion of the engines will be at least slightly different. Conversely, because of the nature of digital components and processing, two speech recognition engines implemented digitally will operate virtually identically. Engine perturbations can also be achieved by selecting a different engine where the two may differ either in the entire algorithmic approach, the parameters of a given algorithm, and/or the language model inputs of a given algorithm.

Returning now to the description of the embodiment shown in FIG. 2, the first speech recognition engine 34 supplies an output signal 38 which is representative of the text recognized by the engine 34. The second speech recognition engine 36 supplies an output signal 40 which is representative of the text recognized by the engine 36. The signals 38 and 40 are each supplied to a text (output) comparator 42. The text comparator 42 compares the text recognized from the first speech recognition engine 34 with the text recognized by the second speech recognition engine 36. The text comparator compares each of the utterances in the speech signal as reflected in the text output and only accepts those utterances which are identically recognized by each of the speech recognition engines. If the identified utterances from the two recognition engines are different, then the utterance is rejected. Thus, the text comparator provides accepted text and rejected text as outputs. The text comparator 42 supplies two output signals: the text produced by each of the speech recognition engines 34 and 36; and a signal indicating whether the text was accepted or rejected.

As stated previously, it is desirable for the input speech signal or recognition processing of each of the speech recognition engines to be slightly different. This gives the possibility of different output text. It is also important that each speech recognition engine have a high accuracy. With respect to a speech recognition engine, accuracy is the percentage of correctly recognized utterances out of the total number of utterances in the input speech signal. Recognition rate is the percentage of correctly recognized utterances out of the total number of utterances for which the speech recognition engine supplies a recognized-text output. In other words, if the speech recognition engine realizes it cannot recognize certain speech and does not supply an output of recognized text, but every utterance for which recognized text is output is correctly recognized, then the recognition rate is 100% while the accuracy is decreased from 100% by the amount of utterances for which a recognized-text output is not supplied.

For example, a particular speech recognition engine may correctly recognize and output text 95% of the time, and incorrectly recognize and output text 5% of the time. Thus, it has both a 95% accuracy and recognition rate. A second speech recognition engine may also correctly recognize 95 % of the time and incorrectly recognize 5 % of the time. Thus, the second speech recognition engine has both a 95% accuracy and recognition rate. However, the 5% inaccuracy for the first engine may occur for different speech or utterances in the message than the 5 % inaccuracy in the second engine. This difference is utilized by the present invention to increase the recognition rate.

If the text comparator does not output any recognized text when the two engines disagree, and there is no overlap in the 5 % inaccuracy, then the recognition rate from the system of the present invention which compares the outputs of two engines will have an accuracy of 90% and a recognition rate of 100%. Of course, an underlying premise of this design approach is that it is preferable to supply no recognized-text output signal than to supply an incorrect recognized-text output signal.

With all of this in mind, it can be seen that it is desirable to have two speech recognition engines that have a relatively-high accuracy and that have inaccuracies which do not completely overlap each other for the same utterances. This requires either two different, but accurate speech recognition engines, or two identical engines with a slight perturbation. Of course, the perturbation can be to the signal or the engine, as previously discussed.

It should be explained that the division of the speech recognition engines in FIG. 2 into a first part and a second part may correspond to the distinction between the analog and the digital portions of the speech recognition engines. Alternatively, the division could take place at another point in the speech recognition engine such that part of the analog circuitry is in the second part. In such a case, there would be no need for a separate perturbation because the separate analog circuitry in the two different speech recognition engines will be sufficient to cause slightly different speech recognition processing.

Figure 3:
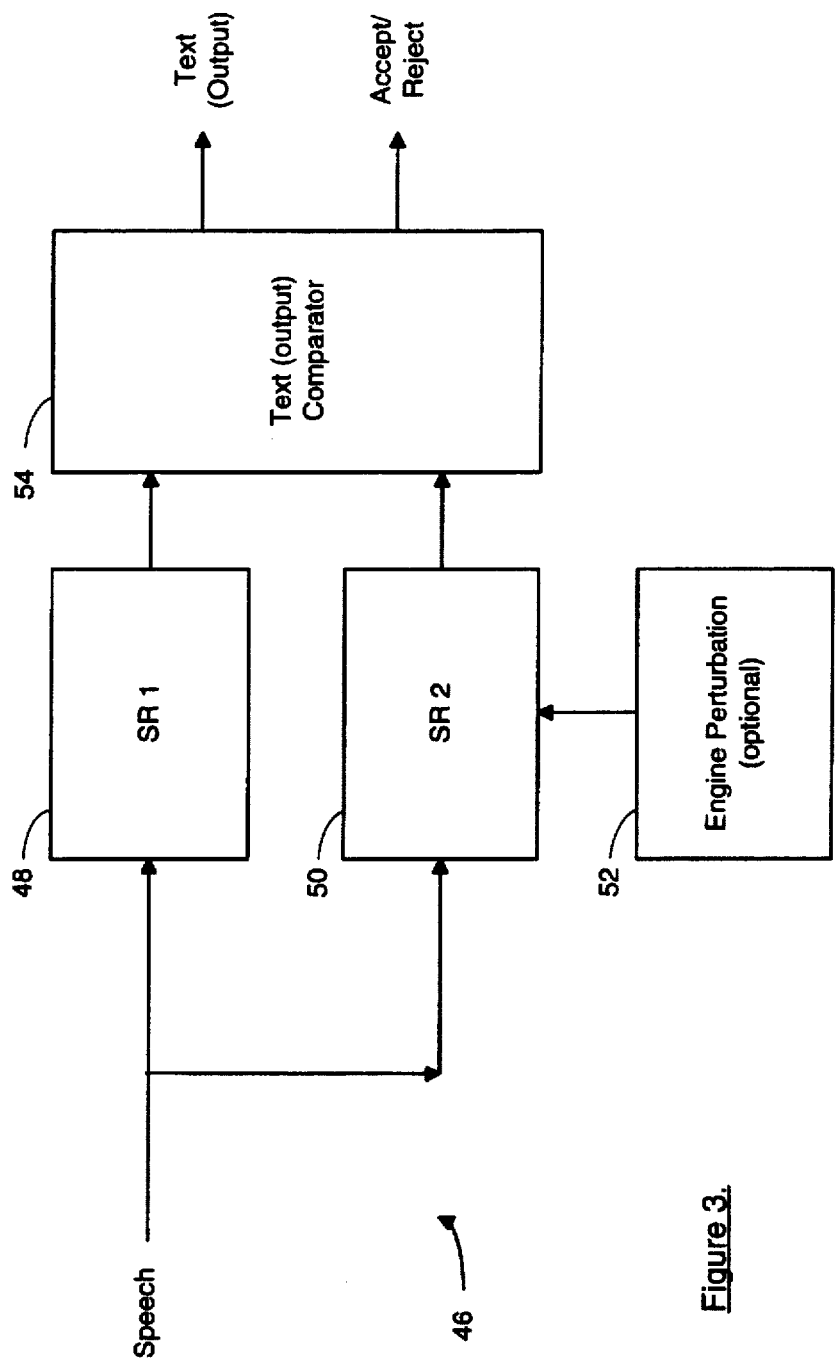
FIG. 3 is a second embodiment of a improved speech recognition system according to the present invention.

FIG. 3 shows a specific embodiment available based on selecting certain options in FIG. 2. In this embodiment, a speech recognition system 46 includes two completely separate speech recognition engines 48 and 50, each of which are receptive of a speech signal. The second speech recognition engine 50 is also receptive of an optional engine perturbation 52 which indicates that the speech recognition engine 50 may be slightly different than the first speech recognition engine 48. In a similar fashion to the previously-described embodiment, the speech recognition system 46 includes a text (output) comparator 54 which is receptive of output signals from each of the speech recognition engines 48 and 50. The text comparator 54 compares the text from each of these speech recognition engines 48 and 50 and supplies as an output both the recognized text and a signal indicating the acceptance or rejection of the text.

Figure 4:
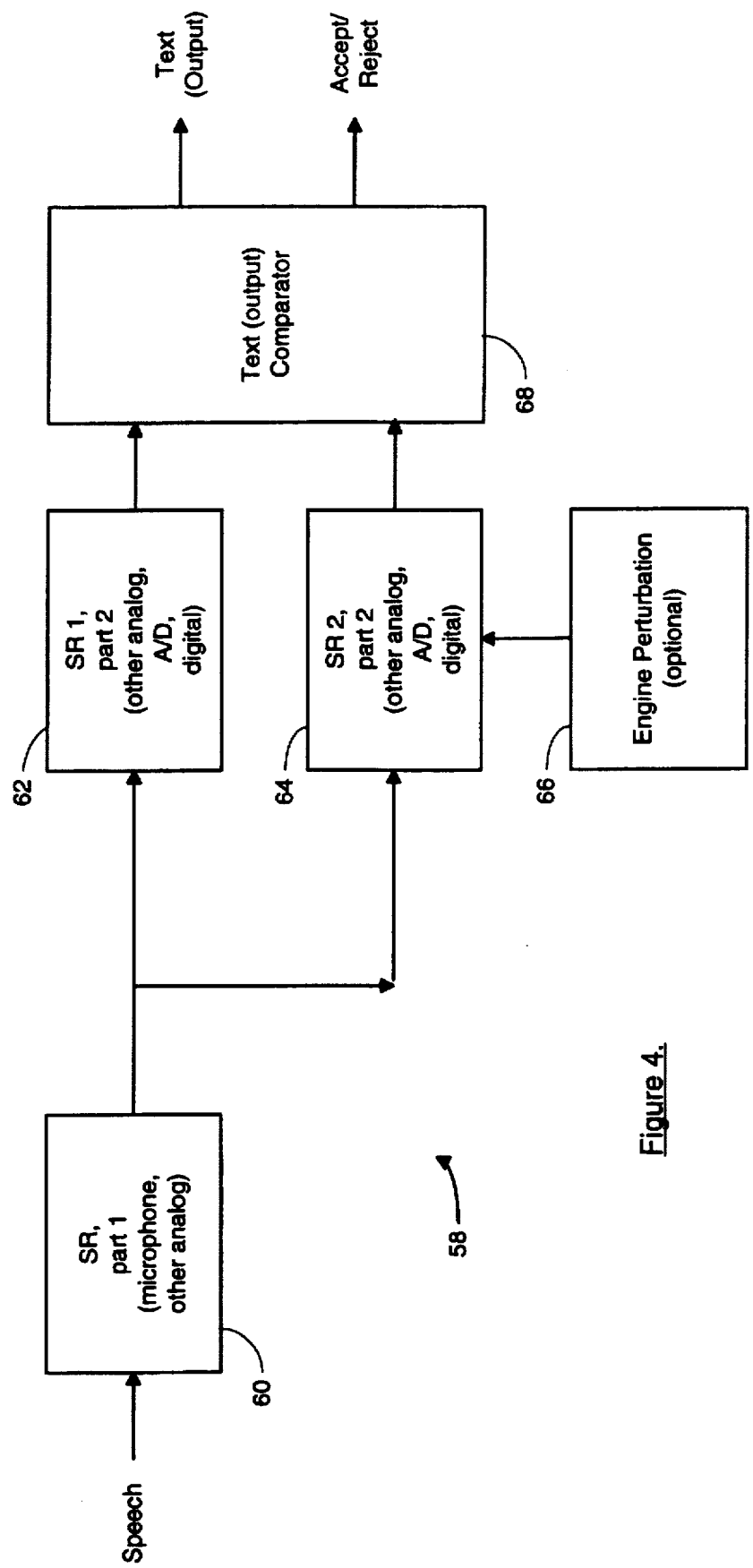
FIG. 4 is a third embodiment of an improved speech recognition system according to the present invention.

Another specific embodiment is illustrated in FIG. 4. A speech recognition engine 58 includes a first part of a speech recognition engine 60 which may include a microphone and other analog circuitry. This first part of the speech recognition engine 60 is receptive of a speech signal and supplies an analog electric signal to the second parts of two different recognition engines 62 and 64. These speech recognition engines 62 and 64 may include other analog circuitry, an analog-to-digital converter, and digital speech recognition processing. An engine perturbation 66 may be supplied to the second speech recognition engine 64 in order to create a slightly different processing by the second speech recognition engine 64 than from the first speech recognition engine 62. This engine perturbation 66 is optional because the other analog circuitry which is included in each of the speech recognition engines 62 and 64 may be sufficient to provide a slightly different processing from the two speech recognition engines. The text output signals from each of the speech recognition engines 62 and 64 are supplied to a text (output) comparator 68 which compares the recognized text from each speech recognition engine 62 and 64. The text comparator 68 supplies both the text and a signal indicating whether the text was accepted or rejected based upon the agreement or disagreement of the text provided from the speech recognition engines 62 and 64.

Figure 5:
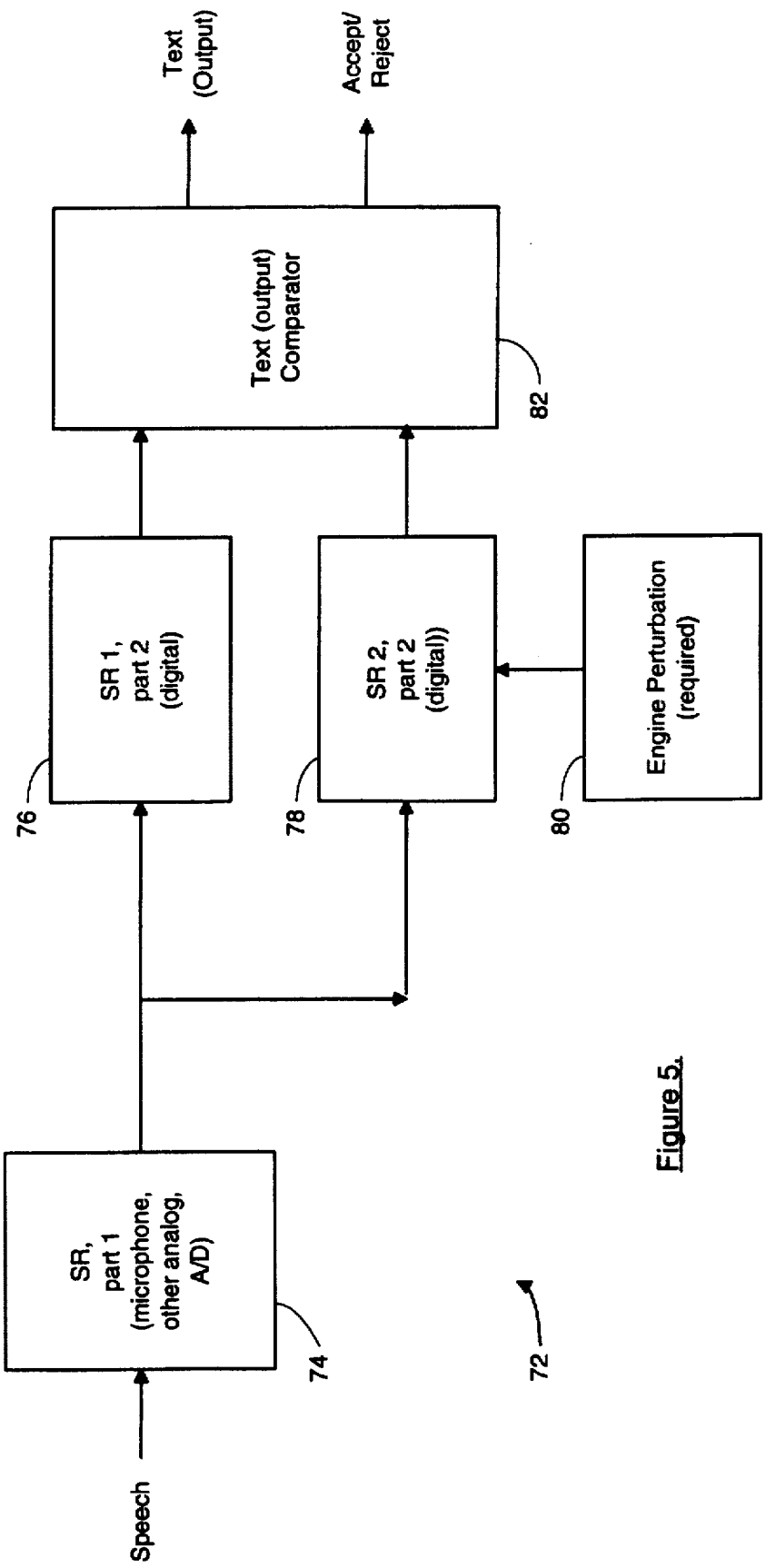
FIG. 5 is a fourth embodiment of an improved speech recognition system according to the present invention.

Another specific embodiment is illustrated in FIG. 5. A speech recognition system 72 includes a first part of a speech recognition engine 74 which may include a microphone, other analog circuitry, and an analog-to-digital converter. A digital output signal is supplied to the second parts (digital only) of both a first and second speech recognition engine 76 and 78. In the case where the second part of the speech recognition engines 76 and 78 are different types of speech recognition engines with different algorithms or models, then a perturbation is not required. However, in the case as shown here where the speech recognition engines are similar enough so as to normally provide an identical or nearly identical outputs, a perturbation is required. In this example, an engine perturbation 80 is supplied to the second speech recognition engine 78. The text (output) signals from each of the speech recognition engines 76 and 78 are supplied to a text (output) comparator 82 which compares the recognized text from each speech recognition engine 76 and 78. The text comparator 82 supplies the text output and a signal indicating whether the text output was accepted or rejected, based upon the agreement or disagreement of the text output provided from the speech recognition engines 76 and 78.

Figure 6:
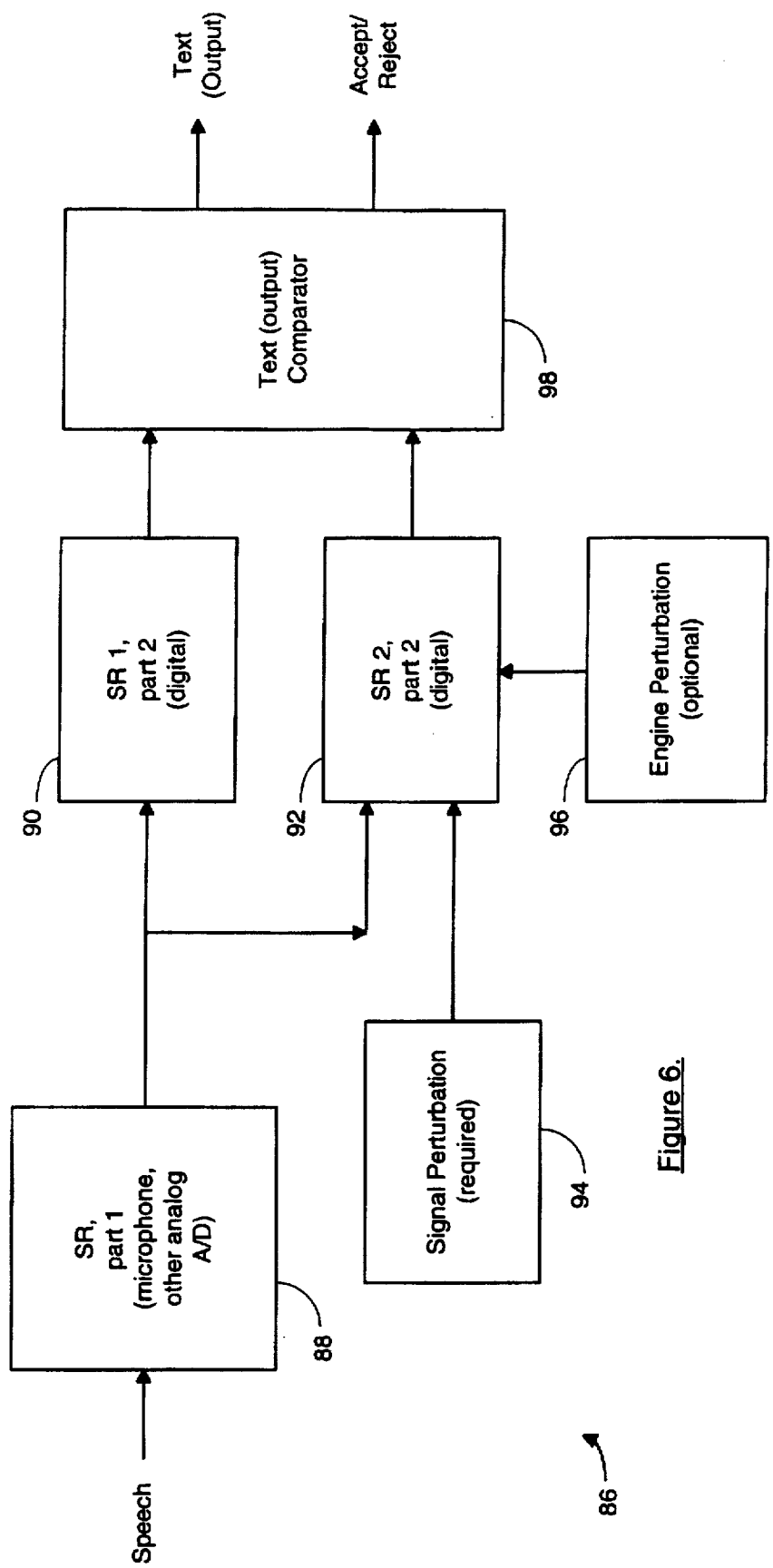
FIG. 6 is a fifth embodiment of an improved speech recognition system according to the present invention.

FIG. 6 shows another specific embodiment which is a slight variation of the embodiment shown in FIG. 5. A speech recognition system 86 includes a first part of a speech recognition engine 88 which may include a microphone, other analog circuitry and an analog-to-digital converter. The digital output from the first part of the speech recognition engine 88 is provided to the second part (digital only) of both a first and second speech recognition engine 90 and 92, respectively. In the case where the second parts of the two speech recognition engines 90 and 92 are sufficiently different so as to provide different processing, no perturbation is required. However, in the specific example shown in FIG. 6, the speech recognition engines 90 and 92 are similar enough so as to require perturbation. In this case, a signal perturbation 94 is provided to the second speech recognition engine 92. Optionally, an engine perturbation 96 can be added as an alternative to the signal perturbation or in addition thereto. The text (output) signals from each of the speech recognition engines 90 and 92 are supplied to a text (output) comparator 98 which compares the recognized text from each speech recognition engine 90 and 92. The text comparator 98 supplies the text output and a signal indicating whether the text output was accepted or rejected based upon the agreement or disagreement of the text output provided from the speech recognition engines 90 and 92.

As can be seen, an important concept of this invention is combining multiple speech recognition engines which each provide a text output which has the possibility of being slightly different from one another. These outputs can then be compared so that the text may be accepted or rejected.

There are clearly a variety of alternatives and options to accomplish this scenario. As has been discussed, the same speech recognition engine could be used twice, at a first and at a subsequent moment in time with the identical speech signal as an input, having a slight signal or engine perturbation added to the speech recognition engine for one of the steps. Also, it is possible for the same speech recognition engine to be implemented identically in a parallel fashion so that the same input speech signal is provided to the two identical speech recognition engines. In this case, a signal or engine perturbation is required if the circuitry is all digital and/or software. As has been discussed, the speech input signal can come from any of a variety of sources including a spoken voice, a microphone, a recording of a voice signal, a telephone or radio transmission of a voice signal, etc. Two different microphones could be used. Two different microphone circuits could be used. The digital signal processing could be different including floating point calculations versus integer calculations. In addition the variations could include different encodings (VQ or not), differently trained or adapted speech models, different model types (templates versus HMMs, etc.), different search parameter settings (beam widths and thresholds), different decoding modes, different system approaches, or completely different speech recognition engines, etc.

Figure 7:
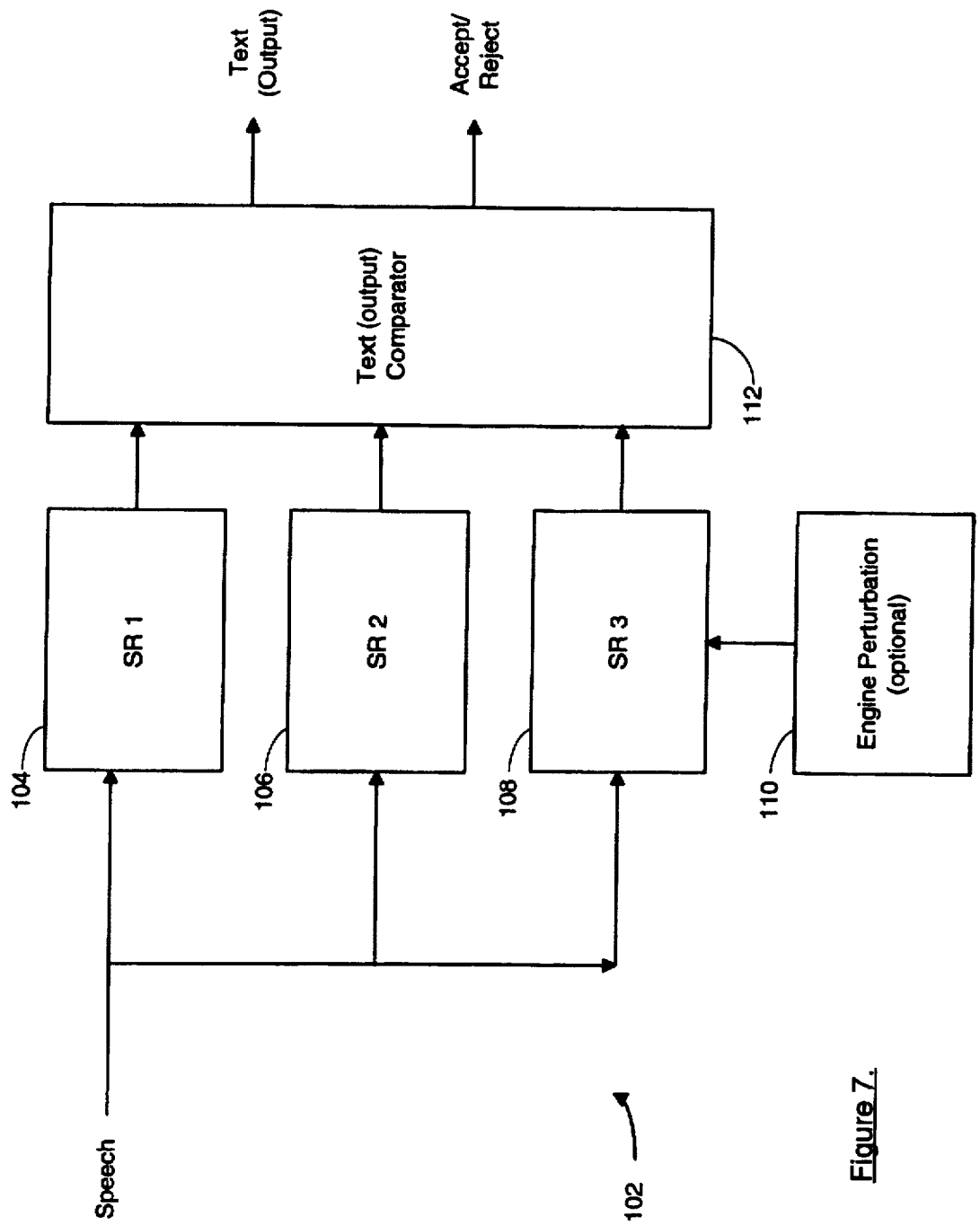
FIG. 7 is a sixth embodiment of an improved speech recognition system according to the present invention.

Another embodiment of an improved system recognition system according to the present invention is shown in FIG. 7. This improved speech recognition system includes three speech recognition engines operating in parallel. Specifically, a speech recognition system 102 includes a first speech recognition engine 104, a second speech recognition engine 106, and a third speech recognition engine 108. Each of the three speech recognition engines 104, 106, and 108 are supplied the speech input signal. Each of the three speech recognition engines 104, 106, and 108 supply a text output signal to a text (output) comparator 112 which compares the recognized text from each speech recognition engine. The text comparator 112 supplies the text output and a signal indicating whether the text output was accepted or rejected based upon the agreement or disagreement of the text output provided from the speech recognition engines 104, 106, and 108. Because there are three text (output) signals rather than the two text (output) signals provided in each of the previous embodiments, the comparison may be more complex and take any of several different forms. The comparison performed by the text comparator 112 may require unanimous agreement between the three speech recognition engines 104, 106, and 108 before text is accepted, rejecting the text if there is not unanimous agreement. Alternatively, the text comparator 112 could accept the text in the case where two of the speech recognition engines agree and the third does not. In this case, the text would only be rejected if all three engines disagreed. Of course, as with the previous embodiments, it may be desirable or necessary to provide signal or engine perturbations.

Of course, any plural number of engines or implementations can be used to accomplish the objectives of the present invention. As the number of speech recognition engines increases it can be appreciated that the comparison performed by the text comparator can be more complex and can utilize any of several different polling or voting techniques.

Throughout this description there have been references to the recognized text supplied by the speech recognition engines. Of course, this could include the top choice for the word or words from the engines or it could include the "n" top choices from the speech recognition engines rather than just the top choice. The "n" top choices refers to a variable number of possibilities, which can be supplied by a speech recognition engine tagged with a probability or in a ranked order of descending probability of being correct. For example, the comparison might require that the top two choices from each engine match before accepting the first as the accepted and recognized text. Alternatively, if the top choice of each do not match, it might be acceptable if one of the engines has a second choice that matches the other engine's top choice. As can be seen, there are a myriad of possible variations for comparison when the "n" top choices are utilized.

Furthermore, the references to output text could refer to a speech recognition engine's output other than text in its narrowest sense. For example, an application for recognizing digits might recognize both "zero" and "oh" as the digit "0". If one engine recognized a word as "zero" while the other recognized it as "oh," this could be considered agreement at a "semantic" level, where the results of the two engines have the same meaning, and could thus be accepted in one version of the comparator. Similarly, for applications recognizing commands to control another system, alternative versions of the same command might be considered to be in agreement and thus accepted in a version of the comparator. An example of this would be words such as "exit," "end," and "quit" all referring to the same action to be taken by an application.

The improved speech recognition systems of the present invention have many advantages of the prior art. Most importantly, they provide high post-rejection accuracy with low rejection rates. Also, they can be combined with existing recognition and rejection methods. Clearly, in fact, the system depends upon existing recognition methods. Further, an initial rejection using different methodology can be performed and then the rejection techniques of the present invention can be applied. Another important feature is that the techniques of the present invention do not make use of the quantitative scores of the individual speech recognition engines, and thus different engines with diverse scoring methods can be employed without any need to make them comparable or compatible.

Importantly, the improvements of the present invention apply to all speech environments including but not limited to adverse speech environments such as high background noise. The techniques of the present invention improve recognition indirectly through a rejection method. The recognition rate on accepted utterances improves as the incorrect utterances are rejected. Consequently, the techniques of the present invention are not necessarily an alternative to and thus are not inconsistent with other approaches to improving speech recognition. Instead, the techniques of the present invention are more in the line of an add-on feature provided at the back end of a speech recognition system. This is demonstrated by the fact that it would be possible to add the concepts of the present invention to the back end of any prior art system to improve the recognition rate. For example, in the Ishii reference discussed in the background section, a rejection method could be appended which checks for agreement among the output text of its multiple recognizers. The utterance would be rejected if they do not all agree, or perhaps if the top "n" scoring choices do not agree, etc. In Tsukada, the output text chosen by the two similarity calculators could be checked for agreement. If they do not agree, rejection could take place right away, without checking the corrected or normalized score against the threshold. Furthermore, if they do agree, the corrected or normalized score would make more sense.

To test the efficacy of the present invention, theoretical calculations using known or typical results from present day speech recognition engines have been performed using two different speech recognition engines each having a 98% recognition accuracy and thus a 2% error. After applying the concepts of the present invention, the combined system may reject approximately 0.6% of the text and of the accepted text the recognition rate would be 98.5%. Of course, the improvement in the recognition rate of the combined speech recognition system is largely a function of the difference in the errors in each individual speech recognition engine and the rejection rate is based largely on that same difference and the recognition rate in each of the individual speech recognition engines. For example, if the two speech recognition engines were identical producing identically correct and incorrect utterances, the rejection rate would be 0% and the recognition rate would be identically 98% to that of each of the individual speech recognition engines. However, in the example of a perfect system, the speech recognition engines would each have the same 98% recognition rate and the 2% erroneous utterances of one speech recognition engine would be the same set of utterances as the 2% erroneous utterances of the other speech recognition engine, but the two systems would make different errors on this same set. In such a case, the rejection rate would be 2% and the recognition rate of the accepted text would be 100%. As can be seen, the measure of how close the combined improved speech recognition systems comes to this perfect standard is largely a function of the difference of the error sets between the two speech recognition engines.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

We claim:

1. An improved speech recognition system for analyzing an input signal to recognize the speech contained within the signal and output an accepted and recognized text signal, comprising:

a first speech recognition engine receptive of the input signal, performing speech recognition processing, and supplying a recognized-text output signal which represents in textual form the speech recognized in the input signal;

a second speech recognition engine receptive of the input signal, performing speech recognition processing, and supplying a recognized-text output signal which represents in textual form the speech recognized in the input signal; and a comparator receptive of the recognized-text output signals from the first and second speech recognition engines and supplying the accepted and recognized text output signal based upon the comparison of the recognized-text output signals, the accepted and recognized text output signal representing in textual form the speech recognized in the input signal and accepted by the computer.

2. An improved speech recognition system as defined in claim 1, wherein the comparison of the recognized-text output signals includes accepting portions of the text when the signals corresponding to those portions of the text are identical and rejecting those portions of the text when the signals corresponding to those portions of the text are different.

3. An improved speech recognition system as defined in claim 1, wherein the first and second speech recognition engines are identical except for a perturbation added to the second speech recognition engine.

4. An improved speech recognition system as defined in claim 3, wherein the perturbation is an engine perturbation which alters the processing of the second speech recognition engine.

5. An improved speech recognition system as defined in claim 3, wherein the perturbation is a signal perturbation which alters the input signal received and processed by the second speech recognition engine.

6. An improved speech recognition system as defined in claim 1, wherein the first and second speech recognition engines are of different types.

7. An improved speech recognition system as defined in claim 3, wherein the first and second speech recognition engines are the very same speech recognition engine performing the processing as the first and second engines at different points in time.

8. An improved speech recognition system as defined in claim 1, wherein the first and second speech recognition engines share a common first part of a speech recognition engine and have separate and distinct second parts of a speech recognition engine.

9. An improved speech recognition system as defined in claim 8, wherein part includes analog circuitry and the second part includes analog and digital circuitry.

10. An improved speech recognition system as defined in claim 8, wherein the first part includes analog circuitry and the second part includes digital circuitry.

11. An improved speech recognition system as defined in claim 1, wherein the recognized-text output signals from the first and second speech recognition engines include multiple possibilities of recognized text ranked in order of the calculated probability of being correct, and wherein the comparison includes comparing the ranked possibilities from the speech recognition engines.

12. An improved speech recognition system for analyzing an input signal to recognize the speech contained within the signal and output an accepted and recognized text signal, comprising:
    multiple speech recognition engines each of which are receptive of the input signal and each of which supply a recognized-text output signal, each of the speech recognition engines being different from each other;
    a comparator receptive of the recognized-text output signals from each of the speech recognition engines, the comparator supplying the accepted and recognized text output signal based upon the comparison of the recognized-text output signals.

13. An improved speech recognition system as defined in claim 12, wherein the comparison of the recognized-text output signals includes accepting portions of the text when the signals corresponding to those portions of the text are identical and rejecting those portions of the text when the signals corresponding to those portions of the text are different.

14. An improved speech recognition system as defined in claim 12, wherein the multiple speech recognition engines include three speech recognition engines and wherein the comparison of the recognized-text output signals includes accepting portions of the text when the signals from a majority of the speech recognition engines corresponding to those portions are identical and rejecting those portions of the text otherwise.

15. A method of recognizing speech represented in an input signal, comprising the steps of:
    receiving the input signal;
    creating a first intermediate signal representative of the input signal;
    recognizing the speech contained in the first intermediate signal;
    supplying a first recognized-text output signal representative of the speech recognized in the first intermediate signal;
    creating a second intermediate signal representative of the input signal;
    recognizing the speech contained in the second intermediate signal;
    supplying a second recognized-text output signal representative of the speech recognized in the second intermediate signal;
    comparing the first and second recognized-text output signals; and
    accepting portions of the compared signals that are identical.

16. A method as defined in claim 15, further including the step of:
    rejecting portions of the compared signals that are not identical.

17. A method as defined in claim 15, wherein the first and second intermediate signals are identical and the recognizing steps are different.

18. A method as defined in claim 15, wherein the first and second intermediate signals are different and the recognizing steps are identical.

19. A method as defined in claim 15, wherein the first and second intermediate signals are different and the recognizing steps are different.

20. A method as defined in claim 15, wherein the recognizing steps are different by adding a perturbation to one of the recognizing steps.

21. A method as defined in claim 15, wherein the first and second intermediate signals are different by adding a perturbation to one of the intermediate signals.

22. A method as defined in claim 15, wherein the creating steps are accomplished with analog circuitry.

* * * * *